United States Patent [19]

Hood

[11] 4,224,492

[45] Sep. 23, 1980

[54] WIPER MECHANISMS

[75] Inventor: Norman L. Hood, Coventry, England

[73] Assignee: Lucas Industries Limited, Birmingham, England

[21] Appl. No.: 969,511

[22] Filed: Dec. 14, 1978

[30] Foreign Application Priority Data

Jan. 6, 1978 [GB] United Kingdom .................. 444/78

[51] Int. Cl.[3] .......................... H01H 3/00; B60S 1/08; H02R 3/10

[52] U.S. Cl. ............................. 200/153 L; 15/250.17; 200/61.39; 200/330; 318/265; 318/466; 318/DIG. 2

[58] Field of Search ......... 200/153 L, 153 LB, 153 T, 200/330, 332, 61.39; 15/250.17; 318/265, 266, 369, 374, 466, DIG. 2

[56] References Cited

U.S. PATENT DOCUMENTS

| | | | |
|---|---|---|---|
| 2,491,697 | 12/1949 | Vischulis, Jr. | 15/250.17 X |
| 2,587,163 | 2/1952 | Jackson | 15/250.17 X |
| 2,725,436 | 11/1955 | Crocker et al. | 200/61.39 |
| 2,734,159 | 2/1956 | Malone | 318/DIG. 2 |
| 2,750,550 | 6/1956 | Latta | 318/265 |
| 2,899,510 | 8/1959 | Merriam | 200/61.39 |
| 2,959,968 | 11/1960 | Gute et al. | 15/250.17 X |
| 3,242,520 | 3/1966 | Carroll et al. | 15/250.17 |

FOREIGN PATENT DOCUMENTS

| | | | |
|---|---|---|---|
| 1655042 | 11/1970 | Fed. Rep. of Germany | 15/250.17 |

*Primary Examiner*—Stephen Marcus
*Attorney, Agent, or Firm*—Ladas & Parry

[57] ABSTRACT

In a reversible motor-operated wiper mechanism including a rotary gearwheel through which drive is imparted to a wiper from the reversible motor, a device is provided for operating a limit switch for stopping the motor at a parked position of the wiper. The device has an annulus and integral cam form and neck disposed under the gear wheel and rotatable relative thereto. An arcuate plate is rivetted to the underside of the gearwheel and includes a downwardly projecting plate portion. During forward rotation of the gearwheel, an abutment surface of the plate portion engages the neck to drive the annulus and cam form. In this direction, a spring urges the cam form upwardly so that a plunger of the limit switch does not lie in the path of movement of the cam form. In the reverse direction of rotation of the gear wheel, a ramp surface on the plate portion urges the cam form downwardly so that the limit switch is operated.

8 Claims, 5 Drawing Figures

Figure 1:
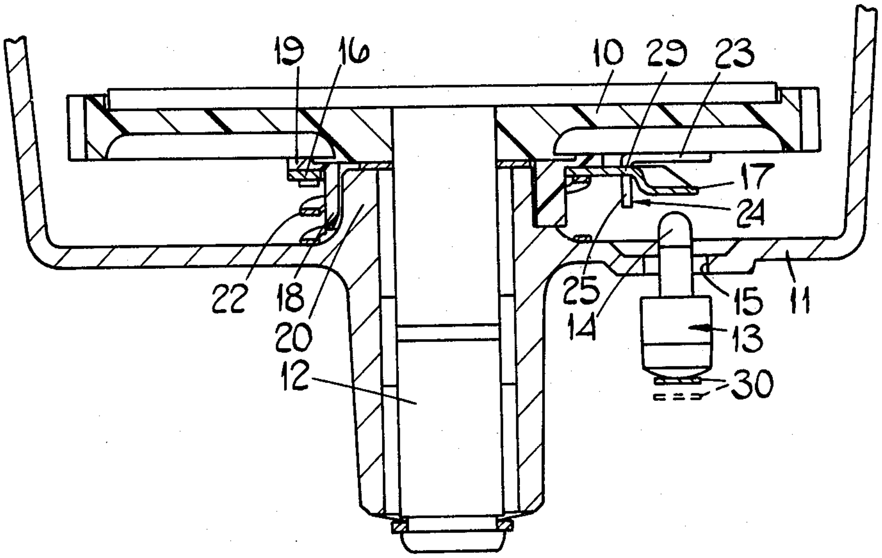

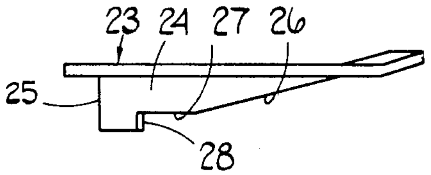
FIG. 3.
FIG. 4.
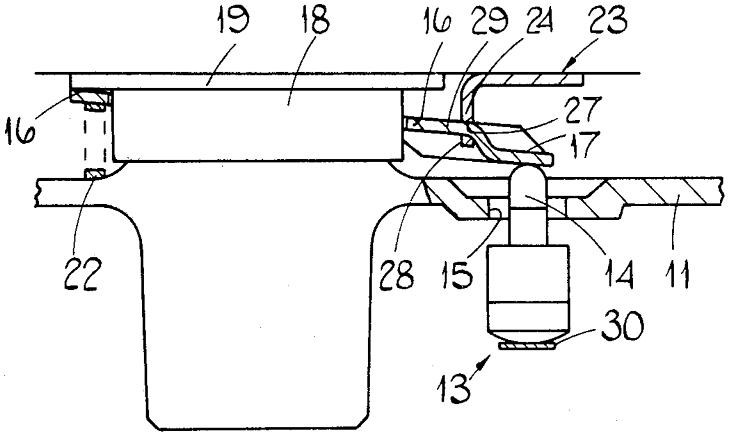
FIG. 5
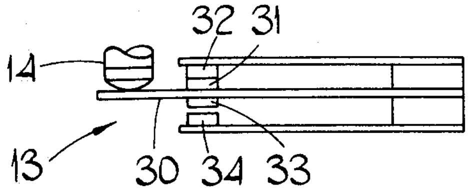

WIPER MECHANISMS

This invention relates to a wiper mechanism driven by a reversible motor which operates in a forward direction of rotation during normal wiping and in a reverse direction of rotation when "parking" of the wipers is required.

With such mechanisms, it is common to arrange a linearly reciprocatable member to be driven by the reversible motor through a crank, the linearly reciprocatable member being connected with the wipers via a linkage or a rack cable. In order to effect parking of the wipers in a position in which they do not obscure vision through the windscreen, a limit switch is provided which is operated only when the wipers reach their parked position. It has been the practice to arrange the limit switch in the path of movement of the linearly reciprocable slider so that it is operated thereby only when the motor is reversed since this reversal of the direction of operation of the motor automatically causes the slider to move beyond its normal limit of travel at one end of its stroke. There is an increasing trend towards maximising the area swept by the wipers during normal operation and so the extra movement required to move the wipers into their parked position is becoming less, e.g. only 10° arc of travel. This means that it is necessary to position the limit switch extremely accurately relative to the slider because, at the end of the stroke of the slider, small errors in the positioning of the limit switch result in large errors in the desired parking position of the wipers. It will be appreciated that it is essential to ensure that the limit switch can be operated by the slider since otherwise the motor would continue to run since the electrical supply to the motor is continued through the limit switch when the manually operable control switch is opened so that if the limit switch is never opened, the motor will continue to run.

It is an object of the present invention to obviate or mitigate the above disadvantage in a wiper mechanism which is operated by a reversible motor by providing a construction which allows the wipers to be more accurately parked and which ensures that operation of the limit switch can consistently occur.

According to the present invention, there is provided, in a reversible motor-operated wiper mechanism including a rotary member through which drive is imparted to a wiper from the reversible motor, a device for operating a limit switch for stopping the motor at a parked position of the wiper, said device comprising a limit switch-operating element mounted, in use, for rotation about the axis of the rotary member, an actuating member mounted for rotation, in use, with the rotary member and drivingly engageable with the operating element in forward and reverse directions of rotation of the rotary member, the actuating member and switch operating element being arranged so that, in the forward direction of rotation of the rotary member, the operating element is urged into a position in which the limit switch lies out of its path of movement and, in the reverse direction of rotation of the rotary member, the operating element is urged into a position in which the limit switch lies in its path of movement so that the limit switch is operated at a predetermined angular position of the rotary member only when the latter is rotating in the reverse direction.

In a preferred embodiment, the operating element is urged by resilient means into one of its said positions and the actuating member, in one of the directions of movement of the rotary member acts on the operating element in a direction to oppose the resilient means. Preferably, the actuating member acts on the operating element during rotation of the rotary member in the reverse direction to urge the operating element into said position in which the limit switch lies in its path of movement.

Conveniently the actuating member has an abutment surface which engages the operating element so as to move the latter when the rotary member is rotating in the forward direction, and has a ramp surface which, during movement of the rotary member in the reverse direction, engages against the operating element and moves it against the action of the resilient means into said position in which the limit switch lies in its path of movement, the actuating member being provided with a further abutment surface against which the operating element engages when it has been urged against the resilient means by the ramp surface.

Most advantageously, means are provided for imparting a frictional resistance to rotation of the operating element.

Conveniently, the resistance-imparting means comprises a friction member having a surface against which a surface of the operating element engages and means urging the surfaces together.

It is preferred for the mutually engaging surfaces of the friction member and the operating element to be provided with undulations thereon to increase the frictional resistance therebetween.

Conveniently, the friction member takes the form of a collar having a flange and the operating element includes an annulus engaged over the collar and engaging against the flange.

Figure 2:
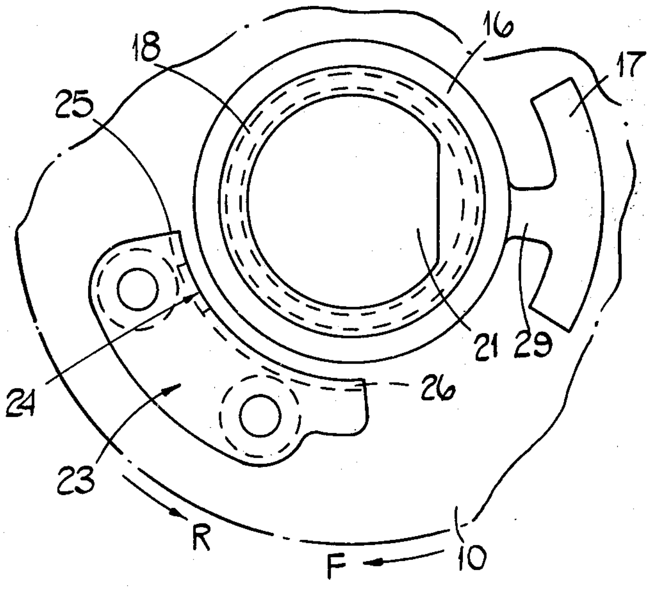

An embodiment of the present invention will now be described, by way of example, with reference to the accompanying drawings, in which:

FIG. 1 is an axial section through part of a vehicle windscreen wiper mechanism illustrating a device according to one embodiment of the present invention for operating a limit switch of the wiper mechanism, FIG. 2 is a top plan view of parts of the operating device of FIG. 1, FIG. 3 is a perspective view of part of the device shown in FIGS. 1 and 2, FIG. 4 is a part-sectional view of part of the mechanism of FIG. 1 showing the operating device in a different position to that illustrated in FIG. 1, and FIG. 5 is a side view of the limit switch.

Referring to the drawings, the operating device for incorporation into a reversible motor operated vehicle windscreen wiper mechanism includes a gear-wheel 10 mounted in a housing 11 for rotation relative thereto on a stub shaft 12. The gear-wheel 10 is rotatable in either a forward direction or in a reverse direction as indicated by arrows F and R respectively in FIG. 2. Although it is not shown in the drawings, the gear-wheel 10 is driven in a manner known per se by a reversible motor through the intermediary of a worm gear mounted on an output shaft of the reversible motor.

The gear-wheel 10 carries a pivot pin which orbits about the axis of rotation of the gear-wheel 10 upon rotation of the latter and which is connected with a linkage for oscillating the vehicle windscreen wipers. This type of mechanism is preferably of the type described in our co-pending British Patent Application No. 445/78 dated Jan. 6th, 1978 in which a simple eccentric mechanism is provided for increasing the effective throw of the crank when the reversible motor is running in the reverse direction as opposed to the forward direction. The reversible motor is controlled by the manually operable switch described in the above-mentioned co-pending British Patent Application, the contents of which are incorporated herein by reference. The reversible motor is provided with a limit switch 13 which serves to effect dynamic braking of the reversible motor when a plunger 14 thereof is depressed. The limit switch 13 is mounted on the housing 11 so that the plunger 14 projects into the housing 11 through an aperture 15 therein. The plunger 14 lies under the gear-wheel 10.

The device for operating the limit switch 14 comprises a limit switch-operating element in the form of an annulus 16 provided with an integral cam form 17. The annulus 16 is mounted on a plastics collar 18 having an outwardly extending annular flange 19 at an upper end thereof. The collar 18 is mounted on an internal boss 20 integral with the housing 11. The collar 18 has a flat 21 on its inner surface which engages with a corresponding flat on the outer surface of the boss 20 to secure the collar 18 against rotation relative to the boss 20. An upper surface of the annulus 16 is urged into engagement with a lower surface of the flange 19 by means of a compression spring 22 which is engaged around the collar 18 and abuts at its lower end against the housing 11. The mutually engaging surfaces of the annulus 16 and the flange 19 have circumferentially extending undulations thereon to increase the frictional resistance to rotation of the annulus 16 relative to the flange 19. The operating device further includes an actuating member in the form of an arcuate plate 23 which is rivetted to the underside of the gear-wheel 10 and which includes a plate portion 24. The plate portion 24 projects downwardly from the gear-wheel 10 and is arcuate in form (as viewed in FIG. 2). At one end, the plate portion 24 is provided with an abutment surface 25 which is the leading surface when the plate 23 is moving in the forward direction of rotation of the gear-wheel 10. The plate portion 24 is provided with a lower edge having a ramp 26 leading to a step 27 and a further abutment surface 28 which extends perpendicularly to the surface of the step 27. The plate portion 24 is aligned with a neck 29 serving to unite integrally the cam 17 with the annulus 16.

In use, when the gear-wheel 10 is rotating in the forward direction F, the abutment surface 25 of the plate portion 23 engages against an edge of the neck 29 and so rotates the annulus 16 and cam 17 therewith. Under these conditions, the spring 22 has urged the cam 17 into a position in which it moves in a path which is spaced above the top of the plunger 14, i.e. the plunger 14 of the limit switch 13 lies out of the path of movement of the cam 17. When the direction of rotation of the gear-wheel 10 is reversed so that it rotates in the direction of arrow R in FIG. 2, the positive drive previously imparted to the cam 17 and annulus 16 no longer takes place and relative movement between the plate portion 24 and the cam 17 occurs. The cam 17 remains relatively stationary because of the frictional resistance to movement imparted by the mutually engaging surfaces of the annulus 16 and the flange 19. Upon continued rotation of the gear-wheel 10 in the reverse direction R, first the ramp 26 engages under the neck 29 and then the step 27 engages thereunder. During this operation, the neck 29 and thus the cam member 17 are urged downwardly to adopt the position illustrated in FIG. 4. This involves movement of the cam 17 in a generally axial direction relative to the axis of rotation of the gear-wheel 10 and against the action of the spring 22. Movement of the plate portion 24 relative to the cam 17 occurs until the neck 29 comes into engagement with the further abutment surface 28. At this location, the cam 17 has been moved to a position in which the plunger 14 of the limit switch 13 lies in the path of movement of the cam 17. Continued rotation of the gear-wheel 10 and thus the plate portion 24 causes the annulus 16 and the cam 17 to rotate about the axis of rotation of the gear-wheel 10 until the plunger 14 is depressed by the cam 17. Depression of the plunger 14 causes depression of a movable contact arm 30 of the limit switch 13. This in turn, causes a first contact 31 (FIG. 5) carried by the movable arm 30 to move out of engagement with a contact 32 and a second contact 33 on movable arm 30 to engage with a contact 34. The contacts 32 and 34 and the arm 30 are connected in the supply circuit to the reversible motor in a manner known per se so that, when the contacts 33 and 34 are in mutual engagement, dynamic braking of the reversible motor takes place.

The above form of mechanism thus permits the limit switch 13 to be operated at a predetermined angular position of the gear-wheel 10 only when the latter is rotating in the reverse direction R. In this predetermined angular portion of the gear-wheel 10, the wipers are in their parked positions.

The above-described arrangement is relatively simple to manufacture and provides an extremely accurate braking of the motor at precisely the desired angular position of the gear-wheel 10. It also ensures that, under no circumstances, can the limit switch 13 be operated with the gear-wheel 10 running in the forward direction. Furthermore, this form of limit switch arrangement readily permits the gear-wheel 10 to be started either in the forward direction F or in the reverse direction R for normal operation or for flick of intermittent wipe as described in the above-mentioned co-pending British Patent Application.

Additionally, the above-described arrangement always allows at least one and never more than two complete revolutions of the crank to take place before dynamic braking is effected. This ensures that, whatever eccentric mechanism is employed, it will always have time to function prior to dynamic braking.

It will be appreciated that the limit switch operating device as described with reference to FIGS. 1 to 4 of the drawings is not only suitable for use with a wiper mechanism of the type described in the above-mentioned co-pending British Patent Application, but is also suitable for use in any wiper operating mechanism where a parked position of the wipers is attained automatically upon reversal of the direction of rotation of the motor.

I claim:

1. In a reversible motor-operated wiper mechanism including a rotary member through which drive is imparted to a wiper from the reversible motor, a device for operating a limit switch for stopping the motor at a parked position of the wiper, said device comprising a limit switch-operating element mounted, in use, for rotation about the axis of the rotary member, an actuating member mounted for rotation, in use, with the rotary member, said actuating member being rotatable relative to said operating element but drivingly engageable therewith in forward and reverse directions of rotation of the rotary member, said actuating member and switch-operating element being arranged so that, in the forward direction of rotation of the rotary member, said operating element is urged into a position in which the limit switch lies out of its path of movement and, in the reverse direction of rotation of the rotary member, said operating element is urged into a position in which the limit switch lies in its path of movement so that the limit switch is operated at a predetermined angular position of the rotary member only when the latter is rotating in the reverse direction.

2. The device according to claim 1, wherein said operating element is urged by resilient means into one of its said positions and said actuating member, in one of the directions of movement of the rotary member acts on said operating element in a direction to oppose said resilient means.

3. The device according to claim 2, wherein said actuating member acts on said operating element during rotation of the rotary member in the reverse direction to urge said operating element into said position in which the limit switch lies in its path of movement.

4. The device according to claim 2, wherein said actuating member has an abutment surface which engages said operating element so as to rotate the latter when the rotary member is rotating in the forward direction, and has a ramp surface which, during movement of the rotary member in the reverse direction, engages against said operating element and moves it against the action of said resilient means into said position in which the limit switch lies in its path of movement, said actuating member being provided with a further abutment surface against which said operating element engages when it has been urged against said resilient means by said ramp surface.

5. The device according to claim 1, wherein means are provided for imparting a frictional resistance to rotation of said operating element.

6. The device according to claim 5, wherein said resistance-imparting means comprises a friction member having a surface against which a surface of said operating element engages, and means urging said surfaces together.

7. The device according to claim 6, wherein said mutually engaging surfaces of said friction member and said operating element are provided with undulations thereon to increase the frictional resistance therebetween.

8. The device according to claim 6, wherein said friction member takes the form of a collar having a flange and said operating element includes an annulus engaged over said collar and engaging against said flange.

* * * * *